(12) United States Patent
Wu et al.

(10) Patent No.: US 12,067,483 B2
(45) Date of Patent: Aug. 20, 2024

(54) MACHINE LEARNING MODEL TRAINING METHOD AND APPARATUS

(71) Applicant: HUAWEI TECHNOLOGIES CO., LTD., Guangdong (CN)

(72) Inventors: Bin Wu, Shenzhen (CN); Fengwei Zhou, Shenzhen (CN); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1165 days.

(21) Appl. No.: 16/431,393

(22) Filed: Jun. 4, 2019

(65) Prior Publication Data
US 2019/0286986 A1   Sep. 19, 2019

Related U.S. Application Data

(63) Continuation of application No. PCT/CN2018/103364, filed on Aug. 30, 2018.

(30) Foreign Application Priority Data

Jan. 11, 2018 (CN) .......................... 201810027720.5

(51) Int. Cl.
*G06N 3/08* (2023.01)
*G06N 3/04* (2023.01)
(Continued)

(52) U.S. Cl.
CPC .................. *G06N 3/08* (2013.01); *G06N 3/04* (2013.01); *G06N 20/00* (2019.01); *G06N 99/00* (2013.01)

(58) Field of Classification Search
CPC ............ G06N 3/08; G06N 3/04; G06N 20/00; G06N 99/00; G06N 3/0454
See application file for complete search history.

(56) References Cited

U.S. PATENT DOCUMENTS

| 2017/0004413 | A1* | 1/2017 | Flores ................ G06F 16/2365 |
| 2018/0276528 | A1* | 9/2018 | Lin ...................... G06V 30/274 |
| 2019/0087408 | A1* | 3/2019 | Komine ................ G06N 5/048 |

FOREIGN PATENT DOCUMENTS

| CN | 101216879 A | 7/2008 |
| CN | 103886184 A | 6/2014 |

(Continued)

OTHER PUBLICATIONS

Ravi et al. "Optimization as a Model for Few-Shot Learning", ICLR 2017 (Year: 2017).*

(Continued)

*Primary Examiner* — Michael J Huntley
*Assistant Examiner* — Imad Kassim
(74) *Attorney, Agent, or Firm* — Fish & Richardson P.C.

(57) ABSTRACT

Embodiments of the present invention provide a machine learning model training method, including: obtaining target task training data and N categories of support task training data; inputting the target task training data and the N categories of support task training data into a memory model to obtain target task training feature data and N categories of support task training feature data; training the target task model based on the target task training feature data and obtaining a first loss of the target task model, and separately training respectively corresponding support task models based on the N categories of support task training feature data and obtaining respective second losses of the N support task models; and updating the memory model, the target task model, and the N support task models based on the first loss and the respective second losses of the N support task models.

16 Claims, 10 Drawing Sheets

(51) Int. Cl.
*G06N 20/00* (2019.01)
*G06N 99/00* (2019.01)

(56) References Cited

FOREIGN PATENT DOCUMENTS

| CN | 104331498 A | 2/2015 |
| CN | 106372666 A | 2/2017 |
| CN | 106548210 A | 3/2017 |
| CN | 107392125 A | 11/2017 |

OTHER PUBLICATIONS

Wei et al. ("Sentiment Learning on Product Reviews via Sentiment Ontology Tree", pp. 404-413, Uppsala, Sweden, Jul. 11-16, 2010) (Year: 2010).*
Cogswell et al. (NPL "Reducing Overfitting in Deep Networks by Decorrelating Representations", ICLR 2016) (Year: 2016).*
Nitish Srivastava et al. (NPL "Dropout: A Simple Way to Prevent Neural Networks from Overfitting", Journal of Machine Learning Research 15 (2014) 1929-1958) (Year: 2014).*
Zhongwen Xu et al. Few-Shot Object Recognition from Machine-Labeled Web Images, Conference on Computer Vision and Pattern Recognition, 2017 IEEE, pp. 5358-5366.
Lukasz Kaiser et al. Learning to Remember Rare Events, Published as a conference paper at ICLR 2017, arXiv:1703.03129v1 [cs.LG] Mar. 9, 2017, total 10 pages.
Kaiming He et al. Deep Residual Learning for Image Recognition, Conference on Computer Vision and Pattern Recognition, 2016 IEEE, pp. 770-778.
Oriol Vinyals et al. Matching Networks for One Shot Learning, 30th Conference on Neural Information Processing Systems (NIPS 2016), total 9 pages.
Sachin Ravi et al. Optimization as a Model for Few-Shot Learning, Published as a conference paper at ICLR 2017, total 11 pages.
Bharath Hariharan et al. Low-shot Visual Recognition by Shrinking and Hallucinating Features, ICCV 2017 spotlight, arXiv:1606.02819v4 [cs.CV] Nov. 4, 2017, total 10 pages.
Qi Cai et al. Memory Matching Networks for One-Shot Image Recognition, CVPR 2018, differarXiv: 1804.08281v1 [cs.CV] Apr. 23, 2018, total 9 pages.
International Search Report and Written Opinion issued in International Application No. PCT/CN2018/103364 on Nov. 29, 2018, 11 pages.

* cited by examiner

S1010. Obtain target task training data and N categories of support task training data S1020. Input the target task training data and the N categories of support task training data into a memory model to obtain target task training feature data and N categories of support task training feature data S1030. Train a target task model based on the target task training feature data and obtain a first loss of the target task model; and separately train respectively corresponding support task models based on the N categories of support task training feature data and obtain respective second losses of the N support task models S1040. Update the memory model, the target task model, and the N support task models based on the first loss of the target task model and the respective second losses of the N support task models

FIG. 3

MACHINE LEARNING MODEL TRAINING METHOD AND APPARATUS

CROSS-REFERENCE TO RELATED APPLICATIONS

This application is a continuation of International Application No. PCT/CN2018/103364, filed on Aug. 30, 2018, which claims priority to Chinese Patent Application No. 201810027720.5, filed on Jan. 11, 2018, The disclosures of the aforementioned applications are hereby incorporated by reference in their entireties.

TECHNICAL FIELD

The present invention relates to the field of machine learning, and in particular, to a machine learning model training method and apparatus.

BACKGROUND

Development of machine learning algorithms lays a foundation for successful application of artificial intelligence technologies in many application scenarios. However, all current machine learning algorithms, especially a deep learning method, depend on a large amount of training data for training a parameter in a model. However, in many scenarios, how to obtain training data becomes a difficult problem. In a robot field, intelligent driving, and machine translation, it is difficult to obtain a large amount of training data. Even if there is a large amount of data currently, for training data, each piece of existing data needs to be labeled, and data labeling requires large consumption of manpower and material resources. Therefore, a machine learning method based on a small amount of training data is important. Compared with conventional machine learning, except for being different in a training data scale, small-sample machine learning has the same applicable scope as that of the conventional machine learning, including classification, regression, reinforcement learning, machine translation, and the like. It can be learned that the small-sample machine learning has great potential commercial value.

In small-sample learning, training (meta-training) data in a small-sample task is usually used to generate a learner (learner). Then the learner makes a prediction for test (meta-testing) data in the small-sample task. The training data and the test data include different categories of data, and only existing training data can be used for training in the small-sample learning. Consequently, an obtained machine learning model overfits the training data, and has poor performance in the test data. In addition, all existing machine learning models are trained individually, and when a machine learning model obtained through training executes a corresponding task, prediction performance is also poor.

SUMMARY

To resolve a prior-art technical problem, embodiments of the present invention provide a machine learning model training method. A machine learning model obtained through training according to the method has obvious improvement in performance, and the method is used in small-sample learning, to better avoid a problem that an obtained model overfits training data and has poor performance in test data.

According to a first aspect, an embodiment of the present invention provides a machine learning model training method. The training method includes: obtaining target task training data and N categories of support task training data, where both the target task training data and the N categories of support task training data are labeled data, the labeled data is data that includes feature information and a label, and that is used for model training, the target task training data corresponds to a target task model, the N categories of support task training data are in a one-to-one correspondence with N support task models, and N is a positive integer; inputting the target task training data and the N categories of support task training data into a memory model to obtain target task training feature data and N categories of support task training feature data, where both the target task training feature data and the N categories of support task training feature data are labeled data, the target task training feature data corresponds to the target task training data, and the N categories of support task training feature data are in a one-to-one correspondence with the N categories of support task training data, to be specific, the memory model abstractly extracts feature information from training data without changing a label, and certainly, in a feature information extraction process, whether to use a corresponding label is related to a specific architecture or algorithm of the memory model; training the target task model based on the target task training feature data and obtaining a first loss of the target task model, and separately training the respectively corresponding support task models based on the N categories of support task training feature data and obtaining respective second losses of the N support task models; and updating the memory model, the target task model, and the N support task models based on the first loss and the respective second losses of the N support task models. The target task model is trained by using the training method, so that performance of the trained target task model can be significantly improved by abstractly storing an advantage of another model and introducing the advantage into the target task model by the memory model in a training process, specifically, by using both a loss of the target task model and a loss of the support task model to update the memory model, the target task model, and the support task model.

In a possible implementation, the updating the memory model, the target task model, and the N support task models based on the first loss and the respective second losses of the N support task models includes: combining the first loss and the respective second losses of the N support task models to obtain a target loss; and updating a first parameter of the memory model, a second parameter of the target task model, and respective third parameters of the N support task models based on the target loss. Optionally, averaging or weighted averaging is performed on the first loss and the respective second losses of the N support task models to implement combining. It should be noted that a loss combining method is not limited to a linear combination manner and may alternatively be another combination manner.

In a possible implementation, the target task training data includes first target task training data and second target task training data. The inputting the target task training data into a memory model to obtain target task training feature data includes: inputting the first target task training data and the second target task training data into the memory model to obtain first target task training feature data and second target task training feature data, where the target task training feature data includes the first target task training feature data and the second target task training feature data, the first target task training feature data corresponds to the first target task training data, and the second target task training feature data corresponds to the second target task training data. The training the target task model based on the target task training feature data and obtaining a first loss of the target task model includes: training the target task model based on the first target task training feature data; and obtaining the first loss of the target task model based on the second target task training feature data and the trained target task model. A specific manner of calculating a loss of the target task model usually depends on an architecture or algorithm of the target task model. In this possible implementation, the target task model is a small-sample learning model, and training data that is used to train the small-sample learning model includes a training set and a test set. The training set corresponds to the first target task training data, and the test set corresponds to the second target task training data. The first loss used as an output is obtained by using data in the test set. In other words, the first loss is calculated by using the second target task training data. In terms of small-sample learning, this can better resolve the problem that an obtained model overfits training data and has poor performance in test data.

Further, the second target task training feature data includes target task feature information and a corresponding target task label; and the obtaining the first loss of the target task model based on the second target task training feature data and the trained target task model includes: obtaining a first test result based on the target task feature information and the trained target task model; and calculating the first loss based on the first test result and the target task label.

Optionally, the second target task training data includes a plurality of target task test samples. Correspondingly, the second target task training feature data includes a plurality of target task test feature samples. Each target task test feature sample includes first target task feature information and a corresponding first target task label. The obtaining a first test result based on the target task feature information and the trained target task model includes: obtaining, based on first target task feature information respectively corresponding to the plurality of target task test feature samples and the trained target task model, first test results respectively corresponding to the plurality of target task test feature samples. The calculating the first loss based on the first test result and the target task label includes: calculating, based on the first test results respectively corresponding to the plurality of target task test feature samples and first target task labels respectively corresponding to the plurality of target task test feature samples, losses respectively corresponding to the plurality of target task test feature samples; and calculating the first loss based on the losses respectively corresponding to the plurality of target task test feature samples.

In a possible implementation, the target task training data includes a plurality of pieces of first training labeled data. The target task training feature data includes a plurality of pieces of first training feature data. The plurality of pieces of first training feature data are in a one-to-one correspondence with the plurality of pieces of first training labeled data. The training the target task model based on the target task training feature data and obtaining a first loss of the target task model includes: training the target task model based on the plurality of pieces of first training feature data, and obtaining a plurality of losses of the target task model, where the plurality of losses of the target task model are in a one-to-one correspondence with the plurality of pieces of first training feature data; and calculating the first loss based on the plurality of losses of the target task model. One piece of training data corresponds to one loss, and an output loss of a corresponding model, that is, the first loss, can be obtained by combining losses corresponding to a plurality of pieces of training data. Losses respectively corresponding to a plurality of target task test feature samples are combined to obtain the first loss, thereby reducing redundancy of data transfer in an updating process and improving updating efficiency.

In a possible implementation, at least one category of the N categories of support task training data includes first support task training data and second support task training data. The inputting the N categories of support task training data into a memory model to obtain N categories of support task training feature data includes: for any one category of the at least one category of support task training data, inputting the first support task training data and the second support task training data into the memory model to obtain first support task training feature data and second support task training feature data, where the first support task training feature data corresponds to the first support task training data, and the second support task training feature data corresponds to the second support task training data. The separately training the respectively corresponding support task models based on the N categories of support task training feature data and obtaining respective second losses of the N support task models includes: for a support task model j, training the support task model j based on the first support task training feature data corresponding to the support task model j, where the support task model j is any one of support task models corresponding to the at least one category of support task training data; and obtaining a second loss of the support task model j based on the second support task training feature data and the trained support task model j. In this possible implementation, the support task model may also be a small-sample learning model. When the support task model is the small-sample learning model, training data corresponding to the support task model may include two parts: the first support task training data and the second support task training data that are respectively used to train a training set and a test set in the small-sample learning model method.

Further, the second support task training feature data includes support task feature information and a corresponding support task label. The obtaining a second loss of the support task model j based on the second support task training feature data and the trained support task model j includes: obtaining a second test result based on the support task feature information and the trained support task model j; and calculating the second loss of the support task model j based on the second test result and the support task label.

Optionally, the second support task training data includes a plurality of support task test samples. Correspondingly, the second support task training feature data includes a plurality of support task test feature samples. Each support task test feature sample includes first support task feature information and a corresponding first support task label. The obtaining a second test result based on the support task feature information and the trained support task model j includes: obtaining, based on first support task feature information respectively corresponding to the plurality of support task test feature samples and the trained support task model j, second test results respectively corresponding to the plurality of support task test feature samples. The calculating the second loss of the support task model j based on the second test result and the support task label includes: calculating, based on the second test results respectively corresponding to the plurality of support task test feature samples and first support task labels respectively corresponding to the plurality of support task test feature samples, losses respectively corresponding to the plurality of support task test feature samples; and calculating the second loss of the support task model j based on the losses respectively corresponding to the plurality of support task test feature samples.

In a possible implementation, each category of the N categories of support task training data includes a plurality of pieces of second training labeled data. Each category of the N categories of support task training feature data includes a plurality of pieces of second training feature data. The plurality of pieces of second training feature data are in a one-to-one correspondence with a plurality of pieces of second training labeled data in corresponding support task training data. The separately training the respectively corresponding support task models based on the N categories of support task training feature data and obtaining respective second losses of the N support task models includes: for a support task model i, training the support task model i based on the plurality of pieces of second training feature data corresponding to the support task model i, and obtaining a plurality of losses of the support task model i, where the plurality of losses of the support task model i are in a one-to-one correspondence with the plurality of pieces of second training feature data corresponding to the support task model i, and the support task model i is any one of the N support task models; and calculating the second loss of the support task model i based on the plurality of losses of the support task model i. One piece of training data corresponds to one loss, and an output loss of a corresponding model, that is, the second loss, can be obtained by combining losses corresponding to a plurality of pieces of training data. Losses respectively corresponding to a plurality of target task test feature samples are combined to obtain the first loss, thereby reducing redundancy of data transfer in an updating process and improving updating efficiency.

In a possible implementation, after the updating the memory model, the target task model, and the N support task models based on the first loss and the respective second losses of the N support task models, the method further includes: determining whether a quantity of updating times exceeds a first threshold; and if the quantity of updating times exceeds the first threshold, outputting the target task model and the memory model; or otherwise, executing the process of obtaining target task training data and N categories of support task training data and repeatedly executing a training process until the foregoing condition is met.

Optionally, after the updating the memory model, the target task model, and the N support task models based on the first loss and the respective second losses of the N support task models, the method further includes: determining whether a difference between the first loss and a first loss obtained last time is less than a second threshold; and if the difference between the first loss and the first loss obtained last time is less than the second threshold, outputting the target task model and the memory model; or otherwise, executing the process of obtaining target task training data and N categories of support task training data and repeatedly executing a training process until the foregoing condition is met.

Optionally, after the updating a first parameter of the memory model, a second parameter of the target task model, and respective third parameters of the N support task models based on the target loss, the method further includes: determining whether a difference between the target loss and a target loss obtained last time is less than a second threshold; and if the difference between the target loss and the target loss obtained last time is less than the second threshold, outputting the target task model and the memory model; or otherwise, executing the process of obtaining target task training data and N categories of support task training data and repeatedly executing a training process until the foregoing condition is met.

In a possible implementation, before the inputting the target task training data and the N categories of support task training data into a memory model to obtain target task training feature data and N categories of support task training feature data, the method further includes: initializing the memory model, the target task model, and the N support task models. Initialization means assigning an initial preset value to a parameter. Optionally, if the memory model, the target task model, and the N support task models are already trained, an initialization operation is no longer performed.

According to the machine learning model training method provided in this embodiment of the present invention, the memory model can be used to obtain, through learning, an abstract concept that is related to a target task and that is included in support data. When being used, the memory model can extract an abstract concept feature from target task data, so that a prediction result of the trained target task model is more accurate.

According to a second aspect, an embodiment of the present invention provides a task processing method. The method includes: obtaining target task data;

inputting the target task data into a memory model to obtain target task feature data; and inputting the target task feature data into a target task model to obtain a target task result, where the memory model, the target task model, and N support task models are obtained through joint training based on target task training data and N categories of support task training data, the target task training data corresponds to the target task model, the N categories of support task training data are in a one-to-one correspondence with the N support task models, the target task training data includes a plurality of pieces of first labeled data, and each category of the N categories of support task training data includes a plurality of pieces of second labeled data, where N is a positive integer.

In a possible implementation, before the inputting the target feature data into a target task model to obtain a target task result, the method further includes: obtaining target task labeled data; inputting the target task labeled data into the memory model to obtain target task labeled feature data; and training the target task model based on the target task labeled feature data; and the inputting the target task feature data into a target task model to obtain a target task result includes: inputting the target task feature data into the trained target task model to obtain the target task result.

In a possible implementation, the memory model and the target task model are obtained through training according to the method described in any one of the first aspect or the possible implementations of the first aspect.

According to the task processing method provided in this embodiment of the present invention, an abstract concept feature can be extracted from the target task data by using the memory model, so that a prediction result of the trained target task model is more accurate.

According to a third aspect, an embodiment of the present invention provides a machine learning model training apparatus. The apparatus includes at least one function module, and the at least one function module is configured to implement the method described in any one of the first aspect or the possible implementations of the first aspect or in any one of the second aspect or the possible implementations of the second aspect. Function modules can communicate with each other, to implement method steps.

According to a fourth aspect, an embodiment of the present invention provides a machine learning model training apparatus. The apparatus includes a memory and a processor. The memory stores a programmable instruction. The processor is configured to invoke the programmable instruction to execute the method described in any one of the first aspect or the possible implementations of the first aspect or in any one of the second aspect or the possible implementations of the second aspect.

According to a fifth aspect, an embodiment of the present invention provides a machine learning model training apparatus. The apparatus includes a processor. The processor is configured to: be coupled to a memory, read an instruction from the memory, and execute, according to the instruction, the method described in any one of the first aspect or the possible implementations of the first aspect or in any one of the second aspect or the possible implementations of the second aspect. Optionally, the memory is a memory inside the apparatus or a memory outside the apparatus. Optionally, the apparatus may be a dedicated chip used for training a machine learning model, and the memory may be integrated into the dedicated chip or may be independent of the dedicated chip.

According to a sixth aspect, an embodiment of the present invention provides a computer-readable storage medium. The computer-readable storage medium stores an instruction, and when the instruction is executed on a computer, the computer is enabled to execute the method described in any one of the first aspect or the possible implementations of the first aspect or in any one of the second aspect or the possible implementations of the second aspect.

According to a seventh aspect, an embodiment of the present invention provides a computer program product including an instruction. When the instruction is executed on a computer, the computer is enabled to execute the method in the foregoing aspects.

According to an eighth aspect, an embodiment of the present invention provides a machine learning model training apparatus. The apparatus includes: a data obtaining module, a first feature extraction module, a training module, and an update module. The first feature extraction module is configured with a memory model, and the training module is configured with a target task model and N support task models. The data obtaining module is configured to obtain target task training data and N categories of support task training data, where both the target task training data and the N categories of support task training data are labeled data, the target task training data corresponds to the target task model, the N categories of support task training data are in a one-to-one correspondence with the N support task models, and N is a positive integer. The first feature extraction module is configured to input the target task training data and the N categories of support task training data that are obtained by the data obtaining module into the memory model to obtain target task training feature data and N categories of support task training feature data, where both the target task training feature data and the N categories of support task training feature data are labeled data, the target task training feature data corresponds to the target task training data, and the N categories of support task training feature data are in a one-to-one correspondence with the N categories of support task training data. The training module is configured to: train the target task model based on the target task training feature data obtained by the first feature extraction module and obtain a first loss of the target task model, and separately train the respectively corresponding support task models based on the N categories of support task training feature data obtained by the first feature extraction module and obtain respective second losses of the N support task models. The update module is configured to update the memory model, the target task model, and the N support task models based on the first loss of the target task model and the respective second losses of the N support task models that are output by the training module.

In a possible implementation, the apparatus further includes a loss combining module. The loss combining module is configured to: combine the first loss of the target task model and the respective second losses of the N support task models that are output by the training module, to obtain a target loss; and input the target loss into the update module. The update module is specifically configured to update a first parameter of the memory model, a second parameter of the target task model, and respective third parameters of the N support task models based on the target loss input by the loss combining module.

According to a ninth aspect, an embodiment of the present invention provides a task processing apparatus. The apparatus includes a target task data obtaining module, a second feature extraction module, and a target task module. The second feature extraction module is configured with a memory model, and the target task module is configured with a target task model. The target task data obtaining module is configured to obtain target task data. The second feature extraction module is configured to input the target task data obtained by the target task data obtaining module into the memory model to obtain target task feature data. The target task model is configured to input the target task feature data obtained by the second feature extraction module into the target task model to obtain a target task result. The memory model, the target task model, and N support task models are obtained through joint training based on target task training data and N categories of support task training data, the target task training data corresponds to the target task model, the N categories of support task training data are in a one-to-one correspondence with the N support task models, the target task training data includes a plurality of pieces of first labeled data, and each category of the N categories of support task training data includes a plurality of pieces of second labeled data, where N is a positive integer.

In a possible implementation, the target task data obtaining module is further configured to obtain target task labeled data. The second feature extraction module is further configured to input the target task labeled data obtained by the target task data obtaining module into the memory model to obtain target task labeled feature data. The target task module is further configured to train the target task model based on the target task labeled feature data obtained by the second feature extraction module.

According to the machine learning model training method provided in the embodiments of the present invention, the memory model can be used to obtain, through learning, the abstract concept that is related to the target task and that is included in the support data. When being used, the memory model can extract the abstract concept feature from the target task data, so that the prediction result of the trained target task model is more accurate.

BRIEF DESCRIPTION OF DRAWINGS

FIG. 3 is a flowchart of a machine learning model training method according to an embodiment of this application;

DESCRIPTION OF EMBODIMENTS

Figure 1:
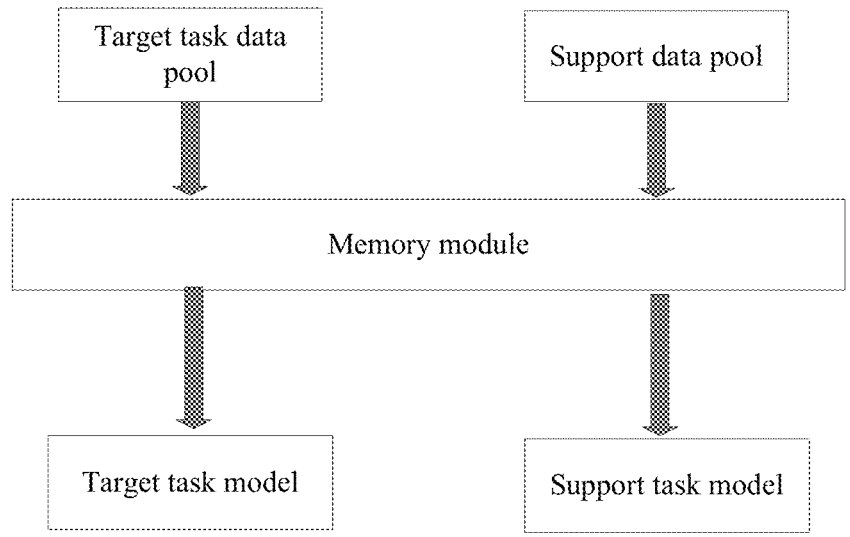
FIG. 1 shows an architecture of a machine learning model training system according to an embodiment of this application.

To make the objectives, technical solutions, and advantages of this application clearer, the following further describes the technical solutions of this application in detail with reference to the accompanying drawings.

For better understanding of the embodiments of the present invention, concepts possibly related to the following embodiments are first explained herein.

Convolutional neural network (CNN): A convolutional neural network is a neural network, and is usually used in image recognition. The convolutional neural network includes a convolutional layer (convolutional layer) and a pooling layer (pooling layer), and includes several layers of neurons. A first layer of neurons is an input layer (an image), a last layer is an output layer (a classification result), and an intermediate layer is a hidden layer.

Residual network (ResNet): A residual network is a convolutional neural network. In image recognition, the residual network has higher recognition accuracy than a conventional convolutional neural network. In a design of the residual network, there are a large quantity of submodules with same structures. Usually, ResNet plus a number is used to indicate a quantity of submodules. For example, ResNet50 indicates that there are 50 submodules.

Target task: In the embodiments of the present invention, a task that needs to be handled is referred to as a target task, for example, a small-sample image recognition task. In the following descriptions, training data of the task that needs to be handled is referred to as target task training data. Possibly, test data is correspondingly referred to as target task test data, and machine learning models or methods used to handle the target task are collectively referred to as a target task model.

Support data: In a previous process of handling different tasks (image recognition, speech recognition, machine translation, or the like), different labeled data is used to train a machine learning model. In the embodiments of the present invention, some data thereof is used, and the data is referred to as support data. Specifically, the data may be support task training data or support task test data. A set of support data is referred to as a support data set. Different support data sets correspond to different tasks. A specific machine model is usually used to handle a corresponding task, and such machine learning models are correspondingly referred to as support task models, such as a support vector machine, a neural network, or a regression model.

Multi-sample data: In some support data sets or training data sets, a specific label corresponds to a plurality of pieces of labeled data, and the plurality of pieces of labeled data are collectively referred to multi-sample data.

In an application scenario of the embodiments of the present invention, for example, in a traffic signal light recognition scenario, an in-vehicle camera needs to accurately recognize a signal of a traffic signal light on a road. However, traffic signal lights have different appearances in different countries (regions) or cities, and a model obtained through training based on a data set of traffic signal lights in a country A or a city A cannot be directly used to effectively recognize a traffic signal light in a country B or a city B. However, actually, an amount of labeled data of traffic signal lights in the country B or the city B is very small, and is insufficient to train a good model. In this case, a method or an apparatus provided in the embodiments of the present invention can be used to obtain a better model, and the model can be used for or support processing of same tasks in different countries or cities.

An embodiment of the present invention provides a framework of a machine learning model training system. As shown in FIG. 1, the system includes a target task data pool, a support data pool, a memory module, a target task model, and a support task model. Target task training data is obtained from the target task data pool, and support task training data is obtained from the support data pool. The target task model, the support task model, and the memory module are trained together based on the target task training data and the support task training data. The memory module may be a machine learning model or may be implemented based on a database. The memory module is configured with a memory model, and the memory model may be denoted as a memory model $f\psi$, where $\psi$ represents a module parameter. In a training process, the memory model is used to extract a low-dimensional abstract feature of data (for example, the target task training data and the support task training data) input into the memory model. When the memory module $\psi$ is implemented based on the database, the low-dimensional abstract feature is stored in a training process. When the memory module $\psi$ is the machine learning model, a piece of input high-dimensional data is given, and a trained parameter $\psi$ is used to extract a corresponding low-dimensional abstract feature. The target task model is a machine learning model, and can feed back a loss of the target task model corresponding to the target task training data to the memory module. The support task model is a machine learning model. It should be noted that, there may be one or more support task models. FIG. 1 schematically shows only one support task model. When there are a plurality of support task models, the plurality of support task models may be same machine learning models or different machine learning models. All constituent parts of the system may be disposed in a same apparatus, or may be communicatively connected in a wired or wireless manner, for example, the task data pool or the support data pool is disposed on a cloud.

According to the machine learning model training system provided in this embodiment of the present invention, after features of the target task training data and a support task training data are extracted by using the memory module, the features of the target task training data and the support task training data are input into (N+1) machine learning models. The (N+1) machine learning models are one target task model and N support task models. The (N+1) machine learning models are separately trained by using data output by the memory module, losses of the (N+1) machine learning models are combined, parameters of the (N+1) machine learning models are adjusted by using losses obtained through combination, and the losses obtained through combination are fed back to the memory module separately by using the (N+1) machine learning models. The memory module adjusts a parameter of the memory model fψ based on the losses obtained through combination. In other words, the memory module, the target task model, and the support task model are all updated based on the losses obtained through combination; logically, an abstract concept is constructed by using the target task training data and the support task training data, and the abstract concept is stored in the memory module. The target task model uses the abstract concept to improve performance.

Figure 2:
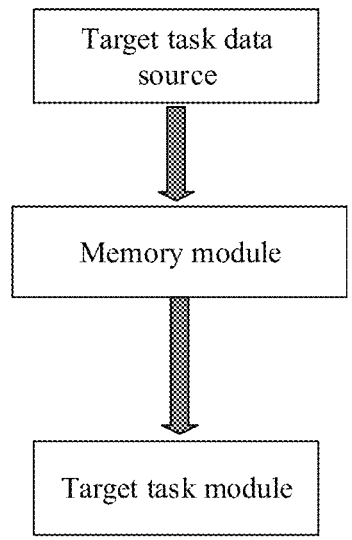
FIG. 2 shows an architecture of a target task processing system according to an embodiment of this application.

An embodiment of the present invention provides an architecture of a target task processing system, that is, a system framework in which a target task model uses an abstract concept stored in a memory module. As shown in FIG. 2, the architecture includes a target task data source, a memory module, and a target task module. The memory module and the target task module are configured with models or algorithms whose related parameters are adjusted through training. The target task data source inputs to-be-processed data into the memory module. After extracting a feature of the to-be-processed data, the memory module inputs the feature into a target task model, so that the target task model obtains a corresponding processing result. An abstract concept formed in a training process is recorded in a parameter of a memory model; when the to-be-processed data is input into the memory module in a task processing and using process, the to-be-processed data uses the abstract concept recorded in the memory module. Forming of the abstract concept is affected by a support task model and support task training data. Logically, an abstract concept is extracted from the support task model and the support task training data in a using process of the system provided in this embodiment of the present invention, so that performance of the target task model is improved.

An embodiment of the present invention provides a machine learning model training method. As shown in FIG. 3, the machine learning model training method includes the following specific steps.

S1010. Obtain target task training data and N categories of support task training data. Both the target task training data and the N categories of support task training data are labeled data. The labeled data is data including feature information and a label that are used for machine learning model training. The target task training data corresponds to a target task model. Optionally, there may be one or more target task models. In this embodiment of the present invention, a quantity of target task models is not limited, and a type of the target task model is not limited, either. The N categories of support task training data are in a one-to-one correspondence with N support task models, where N is a positive integer. Optionally, when N is greater than or equal to 2, the N support task models may be same or different machine learning models or same or different algorithms. An optimal case is that the support task training data belongs to different categories of data sources, so that a training effect is better. Especially, when the support task models are same or similar machine learning models or same or similar algorithms, and the support task training data belongs to different categories of data sources, the training effect is improved.

S1020. Input the target task training data and the N categories of support task training data into a memory model to obtain target task training feature data and N categories of support task training feature data. Both the target task training feature data and the N categories of support task training feature data are labeled data. That is, after features are extracted from the target task training data and the N categories of support task training data by using the memory model, no label is deleted, and feature information and labels are still included. The target task training feature data corresponds to the target task training data, and the N categories of support task training feature data are in a one-to-one correspondence with the N categories of support task training data. Data is not crossly affected in the memory model, and features are separately extracted from different data.

S1030. Train a target task model based on the target task training feature data and obtain a first loss of the target task model; and separately train respectively corresponding support task models based on the N categories of support task training feature data and obtain respective second losses of the N support task models. Different machine learning models have different specific manners of calculating a loss. The following provides detailed descriptions, and details are not described herein.

S1040. Update the memory model, the target task model, and the N support task models based on the first loss of the target task model and the respective second losses of the N support task models.

In this embodiment of the present invention, obtained losses of both the target task model and the support task model are used to update the memory model, the target task model, and the N support task models. The losses of the target task model and the N support task models are used for updating, so that the memory model, the target task model, and the N support task models are logically associated, and an abstract feature is stored in respective parameters. When the target task model trained by using the method provided in this embodiment of the present invention is used together with the memory model, performance is better, and a task processing result is more accurate.

Optionally, before step S1020, the memory model, the target task model, and the N support task models are initialized. Specifically, an initialization operation is usually performed when updating is not yet performed.

Further, step S1040 specifically includes the following steps:

S1041. Combine the first loss of the target task model and the respective second losses of the N support task models to obtain a target loss. Optionally, averaging or weighted averaging is performed on the first loss and the respective second losses to obtain the combined target loss, or combining may be performed by performing another non-linear operation. A specific combining method is not limited.

S1042. Update a first parameter of the memory model, a second parameter of the target task model, and respective third parameters of the N support task models based on the obtained target loss. Optionally, a specific updating procedure is: After the target loss is separately used to update the target task model and the N support task models, the target loss is propagated backward to the memory model to update a parameter thereof.

Optionally, the target task training data includes a plurality of pieces of first training labeled data, the target task training feature data includes a plurality of pieces of first training feature data, and the plurality of pieces of first training feature data are in a one-to-one correspondence with the plurality of pieces of first training labeled data. In this case, the training the target task model based on the target task training feature data and obtaining a first loss of the target task model is specifically: training the target task model based on the plurality of pieces of first training feature data, and obtaining a plurality of losses of the target task model, where the plurality of losses of the target task model are in a one-to-one correspondence with the plurality of pieces of first training feature data; and calculating the first loss based on the plurality of losses of the target task model. The plurality of losses of the target task model are combined to obtain the first loss, thereby reducing redundancy of data transfer in an updating process and improving updating efficiency. Optionally, the plurality of losses of the target task model may be combined in a linear manner such as averaging or weighted averaging, or may be combined in a non-linear manner. It should be noted that the operation of combining the plurality of losses is an optional technical solution, and combining is not necessary in actuality. Whether to perform combining may be determined based on a model type or an algorithm type, and updating is performed after a combined loss is obtained. No combining is performed when there are a plurality of pieces of training data. Essentially, this may be equivalent to a case that one piece of training data is equivalent to one training updating process.

Optionally, each category of the N categories of support task training data includes a plurality of pieces of second training labeled data. Each category of the N categories of support task training feature data includes a plurality of pieces of second training feature data. The plurality of pieces of second training feature data are in a one-to-one correspondence with a plurality of pieces of second training labeled data in corresponding support task training data. The separately training respectively corresponding support task models based on the N categories of support task training feature data and obtaining respective second losses of the N support task models is specifically: for a support task model i, training the support task model i based on the plurality of pieces of second training feature data corresponding to the support task model i, and obtaining a plurality of losses of the support task model i, where the plurality of losses of the support task model i are in a one-to-one correspondence with the plurality of pieces of second training feature data corresponding to the support task model i, and the support task model i is any one of the N support task models; and calculating the second loss of the support task model i based on the plurality of losses of the support task model i. The plurality of losses are combined to obtain the second loss, thereby reducing redundancy of data transfer in an updating process and improving updating efficiency. Optionally, the plurality of losses may be combined in a linear manner such as averaging or weighted averaging, or may be combined in a non-linear manner. It should be noted that the operation of combining the plurality of losses is an optional technical solution, and combining is not necessary in actuality. Whether to perform combining may be determined based on a model type or an algorithm type, and updating is performed after a combined loss is obtained. No combining is performed when there are a plurality of pieces of training data. Essentially, this may be equivalent to a case that one piece of training data is equivalent to one training updating process.

Figure 4:
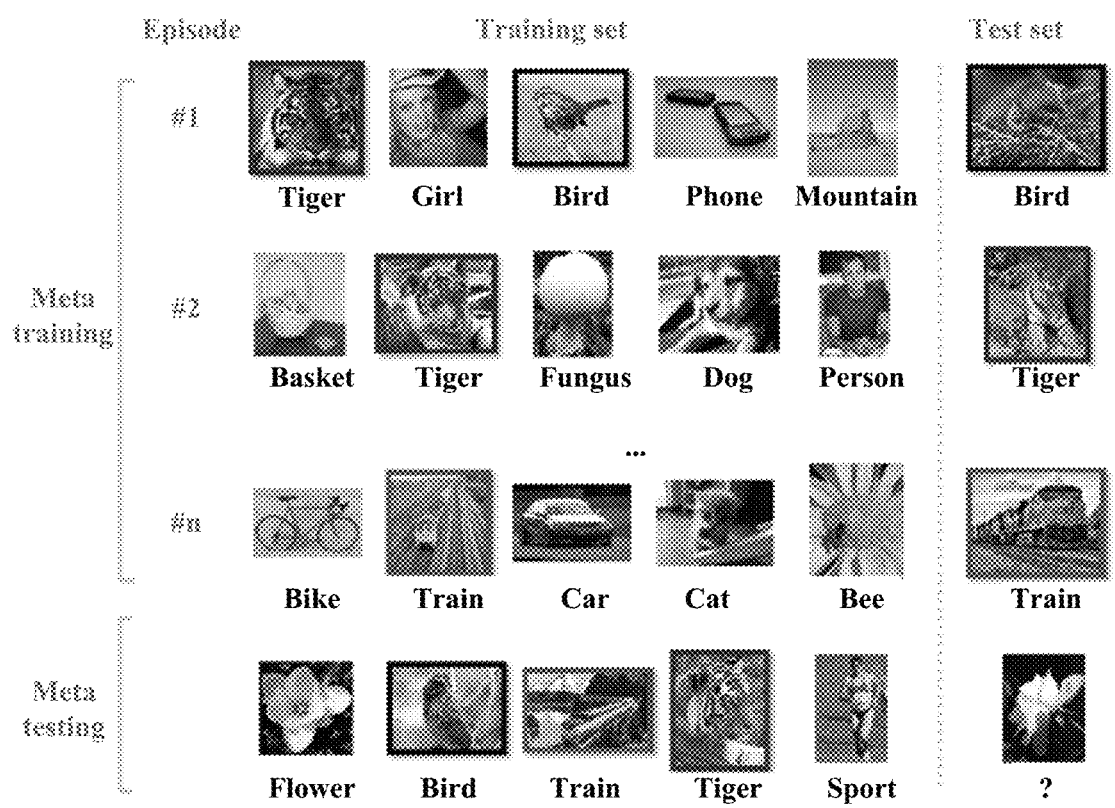
FIG. 4 is a schematic diagram of a small-sample machine learning task according to an embodiment of this application.

In actual application, different machine learning models have different manners of calculating a model loss. For example, in small-sample machine learning meta-learning, meta-learning is a manner of small-sample machine learning. In a meta-learning method, a series of small-sample tasks are used for training to obtain a meta-learner. The meta-learner generates a learner based on training data in the small-sample tasks, and finally the learner completes prediction for test data in the small-sample tasks. A small-sample task is divided into two stages: meta training and meta testing. As shown in FIG. 4, it should be noted that the meta training stage is a process of model training, and the meta testing stage is a process of using a model to execute a task, for example, predicting an image type. Meta-training and meta-testing have a same task structure, and both include a training set (training set) and a test set (testing set). For each task, the meta-learner obtains a learner through learning in the training set, and the learner performs prediction on the test set. The learner may be a neural network, may be a continuous regression function, or may be in another form. The meta-learner is a machine learning method for training the learner. In the meta training stage, a loss is calculated based on the test set and a prediction result and is used as an output loss of the model, for example, the first loss or the second loss in this embodiment of the present invention.

Optionally, a target task learning model is small-sample machine learning. For example, the target task model is a meta-SGD (meta-Stochastic Gradient Descent, meta-stochastic gradient descent) method. The following provides detailed descriptions based on a meta-SGD example, and details are not described herein. Based on some small-sample machine learning features, the target task training data includes first target task training data and second target task training data.

Then, in S1020, the inputting the target task training data into a memory model to obtain target task training feature data is specifically: inputting the first target task training data and the second target task training data into the memory model to obtain first target task training feature data and second target task training feature data, where correspondingly the target task training feature data includes the first target task training feature data and the second target task training feature data, the first target task training feature data corresponds to the first target task training data, and the second target task training feature data corresponds to the second target task training data.

In S1030, the training the target task model based on the target task training feature data and obtaining a first loss of the target task model is specifically: training the target task model based on the first target task training feature data, and obtaining the first loss of the target task model based on the second target task training feature data and the trained target task model.

Further, the second target task training feature data includes target task feature information and a corresponding target task label; and the obtaining the first loss of the target task model based on the second target task training feature data and the trained target task model is specifically: obtaining a first test result based on the target task feature information and the trained target task model; and calculating the first loss based on the first test result and the target task label.

Optionally, the second target task training data includes a plurality of target task test samples. Correspondingly, the second target task training feature data includes a plurality of target task test feature samples, and each target task test feature sample includes first target task feature information and a corresponding first target task label. In this case, the obtaining a first test result based on the target task feature information and the trained target task model is specifically: obtaining, based on first target task feature information respectively corresponding to the plurality of target task test feature samples and the trained target task model, first test results respectively corresponding to the plurality of target task test feature samples. The calculating the first loss based on the first test result and the target task label is specifically: calculating, based on the first test results respectively corresponding to the plurality of target task test feature samples and first target task labels respectively corresponding to the plurality of target task test feature samples, losses respectively corresponding to the plurality of target task test feature samples; and calculating the first loss based on the losses respectively corresponding to the plurality of target task test feature samples. The losses respectively corresponding to the plurality of target task test feature samples are combined to obtain the first loss, thereby reducing redundancy of data transfer in an updating process and improving updating efficiency. Optionally, the losses respectively corresponding to the plurality of target task test feature samples may be combined in a linear manner such as averaging or weighted averaging, or may be combined in a non-linear manner. It should be noted that the operation of combining the plurality of losses is an optional technical solution, and combining is not necessary in actuality. Whether to perform combining may be determined based on a model type or an algorithm type, and updating is performed after a combined loss is obtained. No combining is performed when there are a plurality of pieces of training data. Essentially, this may be equivalent to a case that one piece of training data is equivalent to one training updating process.

The support task model may also be a small-sample machine learning model. For example, a support task model in the N categories of support task models is the small-sample machine learning model. Optionally, at least one category of the N categories of support task training data includes first support task training data and second support task training data. In other words, a support task model corresponding to at least one category of support task training data is a manner of the small-sample machine learning.

Then, in S1020, the inputting the N categories of support task training data into a memory model to obtain N categories of support task training feature data is specifically: for any one category of the at least one category of support task training data, inputting the first support task training data and the second support task training data into the memory model to obtain first support task training feature data and second support task training feature data. The first support task training feature data corresponds to the first support task training data, and the second support task training feature data corresponds to the second support task training data.

In S1030, the separately training respectively corresponding support task models based on the N categories of support task training feature data and obtaining respective second losses of the N support task models is specifically: for a support task model j, training the support task model j based on the first support task training feature data corresponding to the support task model j, where the support task model j is any one of support task models corresponding to the at least one category of support task training data; and obtaining a second loss of the support task model j based on the second support task training feature data and the trained support task model j.

Further, the second support task training feature data includes support task feature information and a corresponding support task label.

Then, the obtaining a second loss of the support task model j based on the second support task training feature data and the trained support task model j is specifically: obtaining a second test result based on the support task feature information and the trained support task model j; and calculating the second loss of the support task model j based on the second test result and the support task label.

Optionally, the second support task training data includes a plurality of support task test samples. Correspondingly, the second support task training feature data includes a plurality of support task test feature samples. Each support task test feature sample includes first support task feature information and a corresponding first support task label. In this case, the obtaining a second test result based on the support task feature information and the trained support task model j is specifically: obtaining, based on first support task feature information respectively corresponding to the plurality of support task test feature samples and the trained support task model j, second test results respectively corresponding to the plurality of support task test feature samples. The calculating the second loss of the support task model j based on the second test result and the support task label is specifically: calculating, based on the second test results respectively corresponding to the plurality of support task test feature samples and first support task labels respectively corresponding to the plurality of support task test feature samples, losses respectively corresponding to the plurality of support task test feature samples; and calculating the second loss of the support task model j based on the losses respectively corresponding to the plurality of support task test feature samples. The losses respectively corresponding to the plurality of support task test feature samples are combined to obtain the second loss of the support task model j, thereby reducing redundancy of data transfer in an updating process and improving updating efficiency. Optionally, the losses respectively corresponding to the plurality of support task test feature samples may be combined in a linear manner such as averaging or weighted averaging, or may be combined in a non-linear manner. It should be noted that the operation of combining the plurality of losses is an optional technical solution, and combining is not necessary in actuality. Whether to perform combining may be determined based on a model type or an algorithm type, and updating is performed after a combined loss is obtained.

Figure 5:
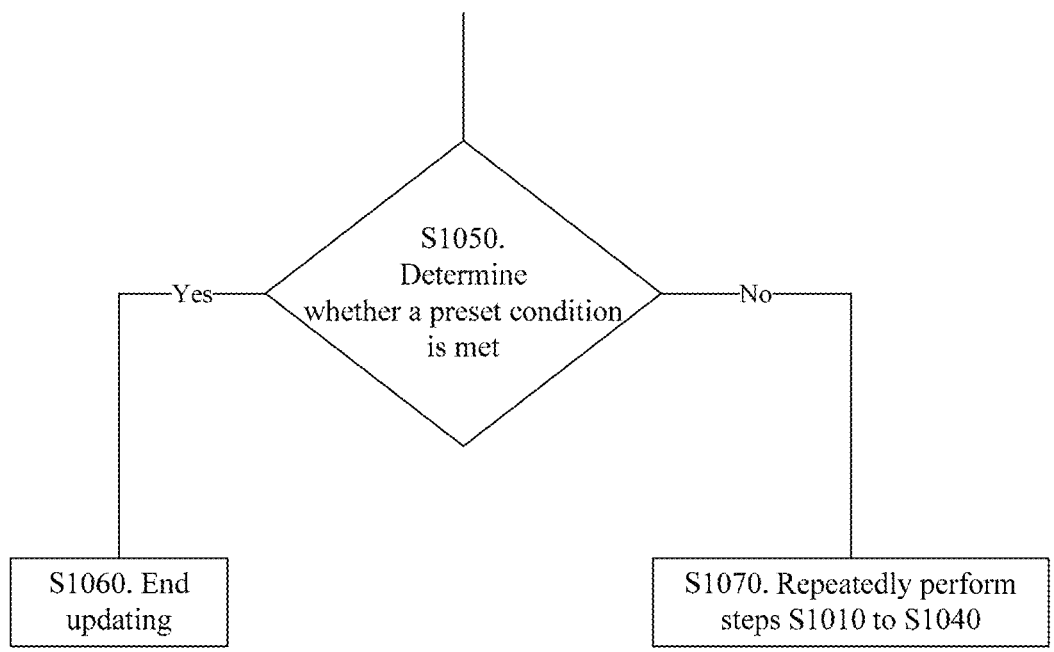
FIG. 5 is a flowchart of a machine learning model training method according to an embodiment of this application.

As shown in FIG. 5, after S1040, the machine learning model training method further includes the following steps.

S1050. Determine whether a preset condition is met; and if the preset condition is met, perform S1060 to end updating, that is, no longer perform steps S1010 to S1040, and optionally, output the trained memory model and the trained target task model; or otherwise, perform S1070 to repeatedly perform steps S1010 to S1040, that is, repeatedly perform training and updating processes until the preset condition is met.

Optionally, in step S1050, the determining whether a preset condition is met is specifically: determining whether a quantity of updating times exceeds a first threshold.

Optionally, in step S1050, the determining whether a preset condition is met is specifically: determining whether a difference between the first loss of the target task model and a first loss obtained last time is less than a second threshold.

Optionally, in step S1050, the determining whether a preset condition is met is specifically: determining whether a difference between the obtained target loss and a target loss obtained last time is less than a second threshold.

After different models are trained according to the machine learning model training method described in the embodiment of the present invention corresponding to FIG. 3, the models can be used to process corresponding tasks such as recognition, classification, and prediction. For example, in an image classification task, it is assumed that there are five categories of objects (including a flower, a bird, a train, a tiger, and an athlete in FIG. 6). In training data, each category includes only one or several pictures. A machine learning model is trained based on the training data, and the trained machine learning model can be used to determine a category to which a test picture (the right-side picture in FIG. 6) belongs.

Figure 7:
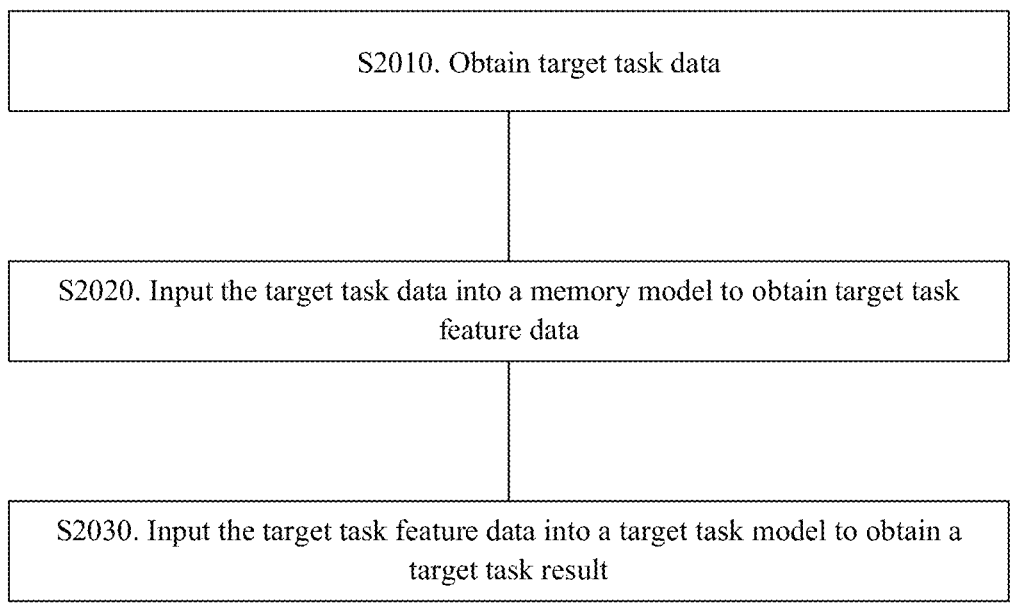
FIG. 7 is a flowchart of a task processing method according to an embodiment of this application.

An embodiment of the present invention provides a task processing method. As shown in FIG. 7, specific steps of the method are as follows:

S2010. Obtain target task data.

S2020. Input the obtained target task data into a memory model to obtain target task feature data.

S2030. Input the obtained target task feature data into a target task model to obtain a target task result. The memory model, the target task model, and N support task models are obtained through training by using the machine learning model training method provided in the embodiment of the present invention corresponding to FIG. 3. For the specific training method, details are not described herein again. For details, refer to the descriptions of the foregoing embodiment of the present invention.

Figure 6:
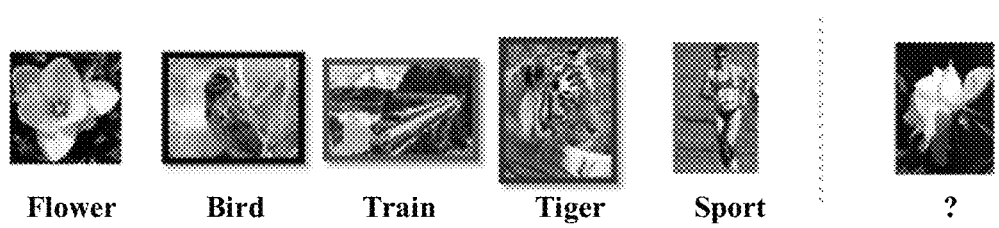
FIG. 6 shows an example of a small-sample machine learning task according to an embodiment of this application.

It should be noted that, if the target task model is a small-sample machine learning model, optionally, before step S2030, the method further includes: obtaining target task labeled data, where the target task labeled data includes feature information and a label; inputting the target task labeled data into the memory model to obtain target task labeled feature data; and training the target task model based on the target task labeled feature data. Correspondingly, in S2030, the inputting the target task feature data into a target task model to obtain a target task result is specifically: inputting the target task feature data into the trained target task model to obtain the target task result. Whether to perform these steps in step S2030 depends on a type of the target task model. In meta-SGD, these steps need to be performed. These steps are equivalent to defining a model, and in the following, the target task model is used to predict a result, to provide a task result within a defined range. For example, as shown in FIG. 6, at a meta testing stage, a training set is equivalent to the target task labeled data. There are five categories of images, and the images are used to define the model in a training process. After a training set (an image whose category is unknown) is input, which of the five categories on the left side in the figure the image belongs to is determined by the meta-SGD.

The following uses small-sample image recognition as an example to further describe the method provided in this embodiment of the present invention.

In this embodiment of the present invention, a support data pool is a multi-sample data pool. 200 categories are randomly selected from 1000 categories in a data set ISLVRC2012, as the support data pool. There are a total of 254,990 images.

The target task is a small-sample task. Optionally, in a data set CIFAR-100, there are 60,000 color images with specifications 32×32, and there are a total of 100 categories. 64 categories of images are selected as a training set, and 20 categories of images are selected as a test set. The test set is equivalent to the corresponding target task data when the model is used. Optionally, Caltech-UCSD Birds-200-2011 (CUB-200) includes images of 200 different categories of birds, and there are a total of 11,788 color images. 140 categories of images are selected as a training set, and 40 categories of images are selected as a test set. The test set is equivalent to the corresponding target task data when the model is used.

In this embodiment of the present invention, a small-sample batch task has two settings: 5-way-1-shot and 5-way-5-shot. "5-way" represents that each small-sample task includes five categories of images, "1-shot" represents that each category of training sample includes one image, and "5-shot" represents that each category of training sample includes five images. Either of the two settings may be selected.

In this embodiment of the present invention, meta-SGD (Meta Learner) is selected for the target task model. The meta-SGD includes three fully connected layers. The support task model is a multi-sample classifier (Image Classifier), and includes only one fully connected layer (Fully Connected Layer, FC). The memory model uses a design the same as that of ResNet50, and a difference lies in that a last layer but one is used as an output layer. Formats of input images are all 224 pixel×224 pixel.

In this embodiment of the present invention, the meta-SGD, the multi-sample classifier, and the memory model are updated according to the following target function formula:

$$\min_{\psi,\phi,\theta,\alpha} \mathbb{E}_{\mathcal{T} \sim p(\mathcal{T}), (x,y) \sim D} C(\mathcal{L}_{test(\mathcal{T})}(\psi, \theta'), l(c_\phi \circ f_\psi(x), y)),$$

where $\mathcal{L}_{test(\tau)}(\psi, \theta')$ is a loss of the target task model; $l(c_\phi \circ f_\psi(x), y)$ is a loss of the multi-sample classifier; an operation C is used to combine the two different losses into one loss, where a plurality of different manners may be used; and $\mathbb{E}$ represents calculating an expectation. Because both the target task training data $\tau$ and the support task training data $(x,y)$ are selected based on a specific probability distribution (where $\tau \sim p(\tau), (x,y) \sim D$), minimization needs to be performed on the expectation $\mathbb{E}_{\tau \sim p(\tau), (x,y) \sim D}$ of the combination to obtain optimum parameters $\psi, \phi, \theta, \alpha$. In addition, if there are N multi-sample classifiers, there are losses of N different multi-sample tasks, and the operation C may be performed to combine (N+1) losses into one loss.

Figure 8:
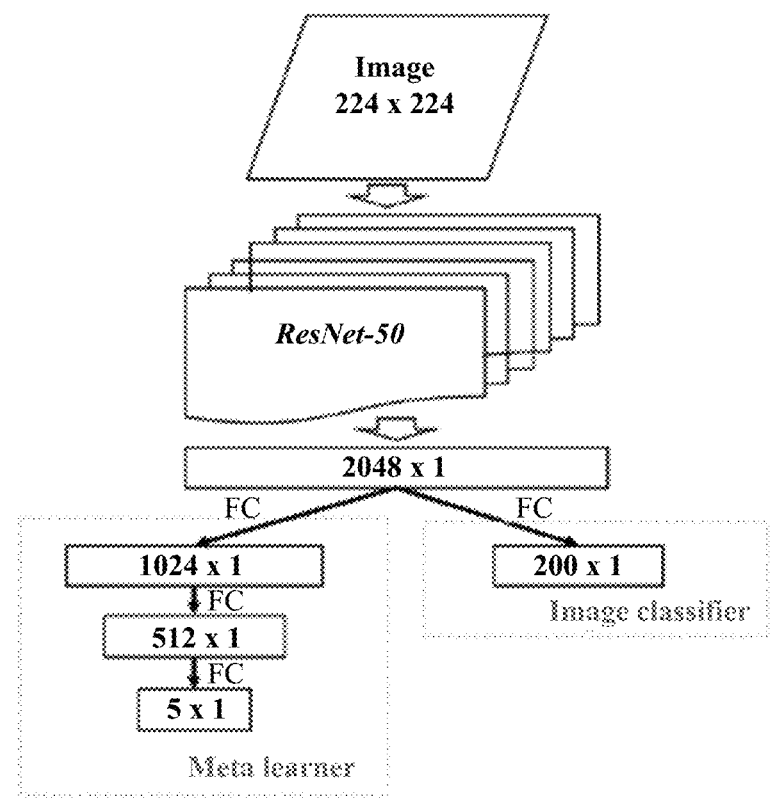
FIG. 8 is a schematic diagram of a design of a neural network system framework according to an embodiment of this application.

A specific design of a system framework is shown in FIG. 8, and a specific procedure is as follows:

S1. Initialize a memory model (ResNet50), meta-SGD, and a multi-sample classifier, where initializing the meta-SGD includes initializing a neural network parameter $\theta$ and a learning rate $\alpha$. The memory model is a residual network, and a parameter $\psi$ of the memory model is initialized. The multi-sample classifier (whose parameter is $\phi$) is initialized in a general neural network initialization manner. It should be noted that if the model is trained, the parameter is directly loaded, or if the model is not trained, the model parameter is initialized in a general manner.

S2. Randomly sample training data from a data pool. Specifically, for a target task (a small-sample task), five categories are randomly sampled from a training set, then one or several images is/are randomly selected from each of the five categories as first target task training data, and then one or several images is/are randomly selected from each of the five categories as second target task training data. For a support task, 64 multi-sample images are randomly selected from a support data pool of 200 categories of images, as support task training data.

S3. Input all the data selected in the previous step into the memory model (ResNet50) for feature extraction. Specifically, each image in data corresponding to the target task is adjusted as a 224×224 input, to obtain a vector with a length of 2048, including first target task training feature data and second target task training feature data. A multi-sample image corresponding to the support task is also input into the memory model for feature extraction, to correspondingly obtain support task training feature data of a vector with a length of 2048.

S4. Calculate a model loss. Specifically, for each target task of a small sample, the meta-SGD obtains a learner $\theta_i'$ based on the first target task training feature data, and then the learner classifies second target task training feature data of each task, and obtain a loss $\mathcal{L}_{test(\tau)}(\psi, \theta')$ based on a true label. The multi-sample classifier directly obtains a classification loss $l(c_\phi \circ f_\psi(x), y)$ (a cross entropy) based on 64 input features, directly predicts classification information of all training data, and compares a prediction result with a true category to obtain the loss. The operation C is performed to combine losses in a linear manner. Each training may include a plurality of target tasks (small-sample tasks).

S5. Update the meta-SGD ($\theta$ and $\alpha$), the multi-sample classifier ($\phi$), and a parameter $\psi$ of the memory model based on a combined loss.

A corresponding using process (task processing) includes the following specific procedure:

S01. The memory model (memory module) loads the trained parameter $\psi$.

S02. Randomly select five categories from the test set, and randomly select one or several images from each of the five categories as target task labeled data, so that the trained meta-SGD obtains the learner.

S03. Randomly select five categories from the test set, randomly select one or several images from each of the five categories as target task data, and input the target task data to obtain a learner, to obtain a prediction result.

According to the machine learning model training method provided in this embodiment of the present invention, accuracy of small-sample image recognition is improved significantly. Results of comparison between the method or model in this embodiment and other training methods or individually trained models are listed in the following tables:

CIFAR-100 Result

| Method | 5-way-1-shot | 5-way-5-shot |
|---|---|---|
| Matching Nets | 50.53 ± 0.87 | 60.3 ± 0.82 |
| Meta-LSTM | 44.76 ± 0.81 | 61.85 ± 0.81 |
| MAML | 49.28 ± 0.90 | 58.30 ± 0.80 |
| Meta-SGD | 53.83 ± 0.89 | 70.40 ± 0.74 |

-continued

| Method | 5-way-1-shot | 5-way-5-shot |
|---|---|---|
| Ext + kNN | 47.04 ± 0.80 | 65.96 ± 0.73 |
| Ours | 61.62 ± 1.01 | 77.94 ± 0.74 |

CUB-200 Result

| Method | 5-way-1-shot | 5-way-5-shot |
|---|---|---|
| Matching Nets | 56.53 ± 0.99 | 63.54 ± 0.85 |
| Meta-LSTM | 52.48 ± 0.85 | 63.54 ± 0.86 |
| MAML | 50.45 ± 0.97 | 59.60 ± 0.84 |
| Meta-SGD | 53.34 ± 0.97 | 67.59 ± 0.82 |
| Ext + kNN | 45.58 ± 0.78 | 65.57 ± 0.70 |
| Ours | 66.95 ± 1.06 | 77.11 ± 0.78 |

It can be learned from the two image data sets that the method provided in this embodiment of the present invention, denoted as MACN (the last row), has higher recognition accuracy than the prior-art methods. In a 5-way-1-shot result of a data set CUB-200, recognition accuracy even increases from 53.34% to 66.95%.

Figure 9:
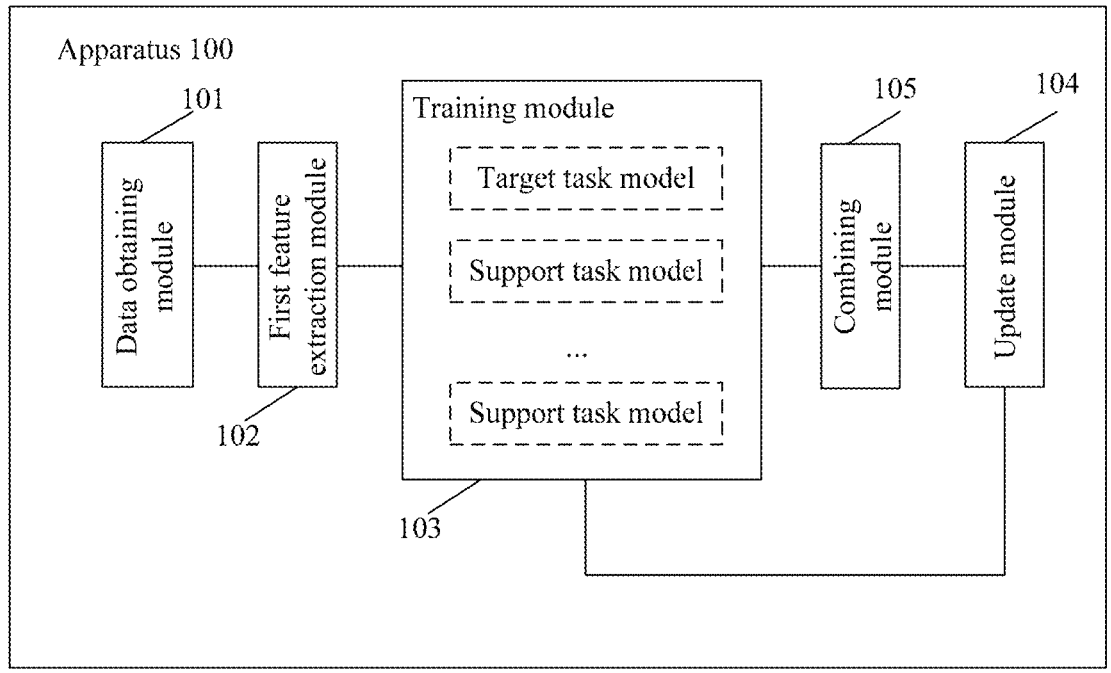
FIG. 9 is a schematic diagram of a machine learning model training apparatus according to an embodiment of this application.

An embodiment of the present invention provides a machine learning model training apparatus 100, configured to implement the method described in the embodiment of the present invention corresponding to FIG. 3. As shown in FIG. 9, the apparatus 100 includes a data obtaining module 101, a first feature extraction module 102, a training module 103, and an update module 104. The first feature extraction module 102 is configured with a memory model. For related descriptions of the memory model, refer to descriptions of the foregoing embodiment of the present invention, and details are not described herein again. It should be noted that in actual use of the apparatus 100, the memory model in the first feature extraction module 102 may be reconfigured depending on a requirement. The training module is configured with a target task model and N support task models, where N is a positive integer. For related descriptions of the target task model and the N support task models, refer to descriptions of the foregoing embodiment of the present invention, and details are not described herein again. It should be noted that in actual use of the apparatus 100, models in the training module 103, including the target task model and the N support task models, may be reconfigured depending on a training requirement.

The data obtaining module 101 is configured to perform step S1010 in the foregoing embodiment, that is, obtain target task training data and N categories of support task training data.

The first feature extraction module 102 is configured to perform step S1020 in the foregoing embodiment, that is, input the target task training data and the N categories of support task training data that are obtained by the data obtaining module 101 into the memory model in the first feature extraction module 102, to obtain target task training feature data and N categories of support task training feature data.

The training module 103 is configured to perform step S1030 in the foregoing embodiment, that is, train the target task model based on the target task training feature data obtained by the first feature extraction module 102 and obtain a first loss of the target task model, and separately train the respectively corresponding support task models based on the N categories of support task training feature data obtained by the first feature extraction module 102 and obtain respective second losses of the N support task models.

The update module 104 is configured to perform step S1040 in the foregoing embodiment, that is, trigger updating the memory model, the target task model, and the N support task models based on the first loss of the target task model and the respective second losses of the N support task models that are output by the training module 103.

The apparatus 100 further includes a loss combining module 105, configured to: combine the first loss of the target task model and the respective second losses of the N support task models that are output by the training module 103, to obtain a target loss; and input the target loss into the update module 104. Correspondingly, the update module 104 updates a first parameter of the memory model, a second parameter of the target task model, and respective third parameters of the N support task models based on the target loss. Specifically, the update module 104 inputs the target loss into the training module 103 to separately update the second parameter of the target task model and the respective third parameters of the N support task models. Then the training module 103 propagates backward, to the first feature extraction module 102, related parameters that are obtained through updating based on the target loss and that are of the target task model and the N support task models, to update the memory model. For a specific combining manner, refer to descriptions of the foregoing embodiment of the present invention. Details are not described herein again.

After training is completed, the first feature extraction module 102 may output the memory model whose parameter is adjusted, and the training module 103 may output the trained target task model.

Optionally, after training is completed, the trained memory model and the trained target task model may alternatively not be output, and may be directly used to process a target task. When processing the target task, the data obtaining module 101 is configured to perform step S2010 in the foregoing embodiment, that is, obtain target task data. The first feature extraction module 102 performs step S2020 in the foregoing embodiment, that is, inputs, into the memory model in the first feature extraction module 102, the target task data input by the data obtaining module 101, to obtain target task feature data. The training module 103 performs step S2030 in the foregoing embodiment, that is, inputs, into the target task model in the training module 103, the target task feature data input by the first feature extraction module 102, to obtain a target task result. If the target task model is a small-sample machine learning model, optionally, the data obtaining module 101 is further configured to obtain target task labeled data, where the target task labeled data includes feature information and a label. The first feature extraction module 102 is further configured to input, into the memory model, the target task labeled data input by the data obtaining module 101, to obtain target task labeled feature data. The training module 103 is further configured to train the target task model based on the target task labeled feature data input by the first feature extraction module 102.

The modules in this embodiment of the present invention can further implement other method steps described in the embodiment of the present invention corresponding to FIG. 3. Details are not described herein again.

Figure 10:
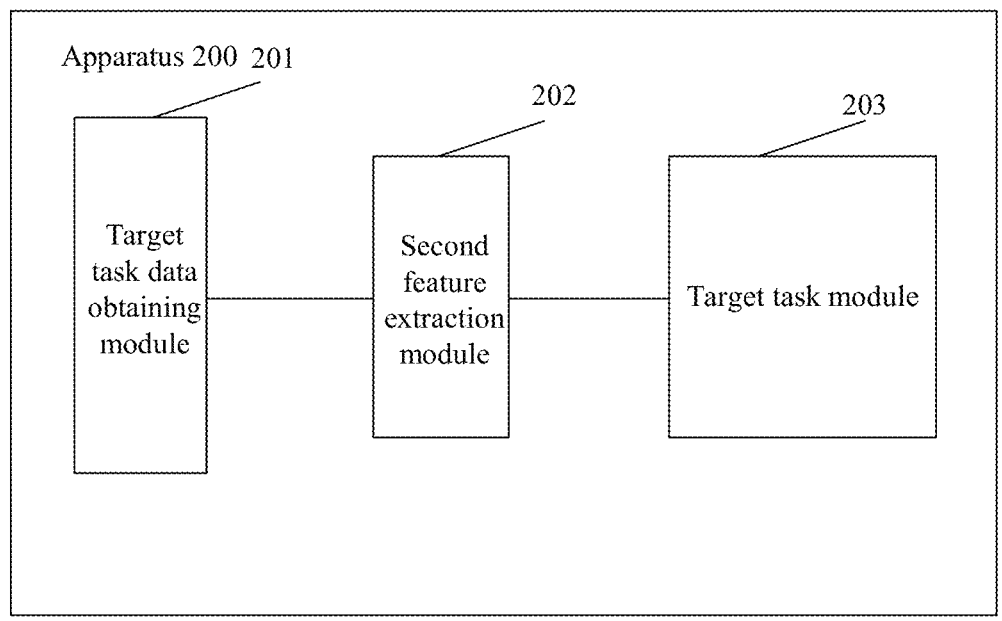
FIG. 10 is a schematic diagram of a task processing apparatus according to an embodiment of this application.

An embodiment of the present invention provides a machine learning model training apparatus 200, configured to implement the method described in the embodiment of the present invention corresponding to FIG. 7. As shown in FIG. 10, the apparatus 200 includes a target task data obtaining module 201, a second feature extraction module 202, and a target task module 203. The second feature extraction module 202 is configured with a memory model whose parameter is adjusted. For related descriptions of the memory model, refer to descriptions of the foregoing embodiment of the present invention, and details are not described herein again. It should be noted that in actual use of the apparatus 200, the memory model in the second feature extraction module 202 may be reconfigured depending on a requirement. Optionally, the second feature extraction module 202 of the apparatus 200 receives the memory model output by the first feature extraction module 102 of the apparatus 100 in the foregoing embodiment of the present invention. The target task module 203 is configured with a trained target task model. For related descriptions of the target task model, refer to descriptions of the foregoing embodiment of the present invention, and details are not described herein again. It should be noted that in actual using of the apparatus 200, the target task model in the target task module 203 may be reconfigured depending on a target task requirement. Optionally, the target task module 203 of the apparatus 200 receives the target task model output by the training module 103 of the apparatus 100 in the embodiment of the present invention.

The target task data obtaining module 201 is configured to perform step S2010 in the foregoing embodiment, that is, obtain target task data. For example, in an image recognition task, a picture that is not labeled may be used as the target task data.

The second feature extraction module 202 performs step S2020 in the foregoing embodiment, that is, inputs the target task data obtained by the target task data obtaining module 201 into the memory model in the second feature extraction module 202, to obtain target task feature data.

The target task module 203 performs step S2030 in the foregoing embodiment, that is, inputs the target task feature data obtained by the second feature extraction module 202 into the target task model in the target task module 203, to obtain a target task result.

If the target task model is a small-sample machine learning model, optionally, the target task data obtaining module 201 is further configured to obtain target task labeled data. The target task labeled data includes feature information and a label. The second feature extraction module 202 is further configured to input the target task labeled data obtained by the target task data obtaining module 201 into the memory model to obtain target task labeled feature data. The target task module 203 is further configured to train the target task model based on the target task labeled feature data obtained by the second feature extraction module 202.

Optionally, the apparatus 200 may further include the described modules in the apparatus 100 that are configured to train and update the target task module and the memory model. Details are not described herein again, and reference may be made to descriptions of the foregoing embodiment of the present invention.

Figure 11:
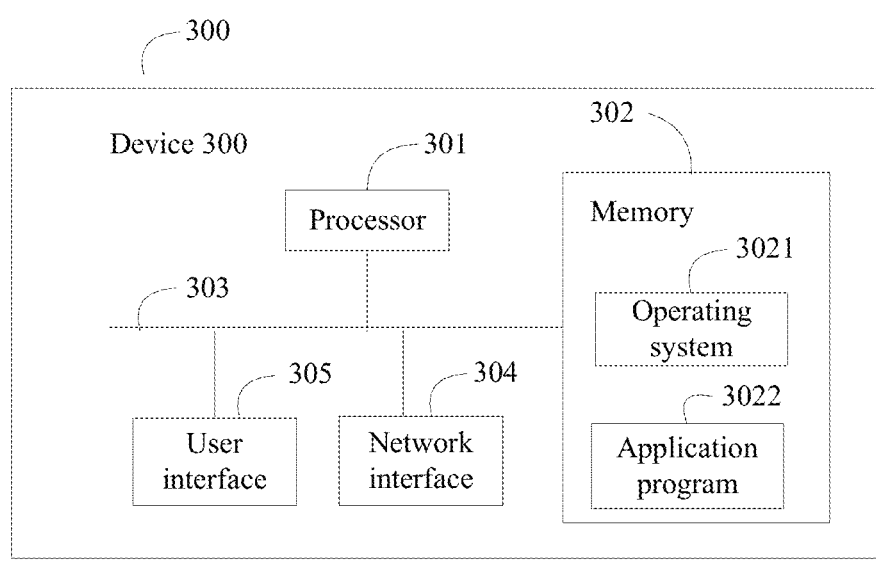
FIG. 11 is a schematic diagram of a device according to an embodiment of this application.

An embodiment of the present invention provides a machine learning model training device 300. As shown in FIG. 11, the device 300 includes at least one processor 301, a memory 302, at least one communications bus 303, and at least one network interface 304 or another user interface 305. The communications bus 303 is configured to implement connection and communication between these components.

The memory 302 may include a read-only memory and a random access memory, and provide an instruction and data for the processor 301. A part of the memory 302 may further include a nonvolatile random access memory (NVRAM).

Figure 12:
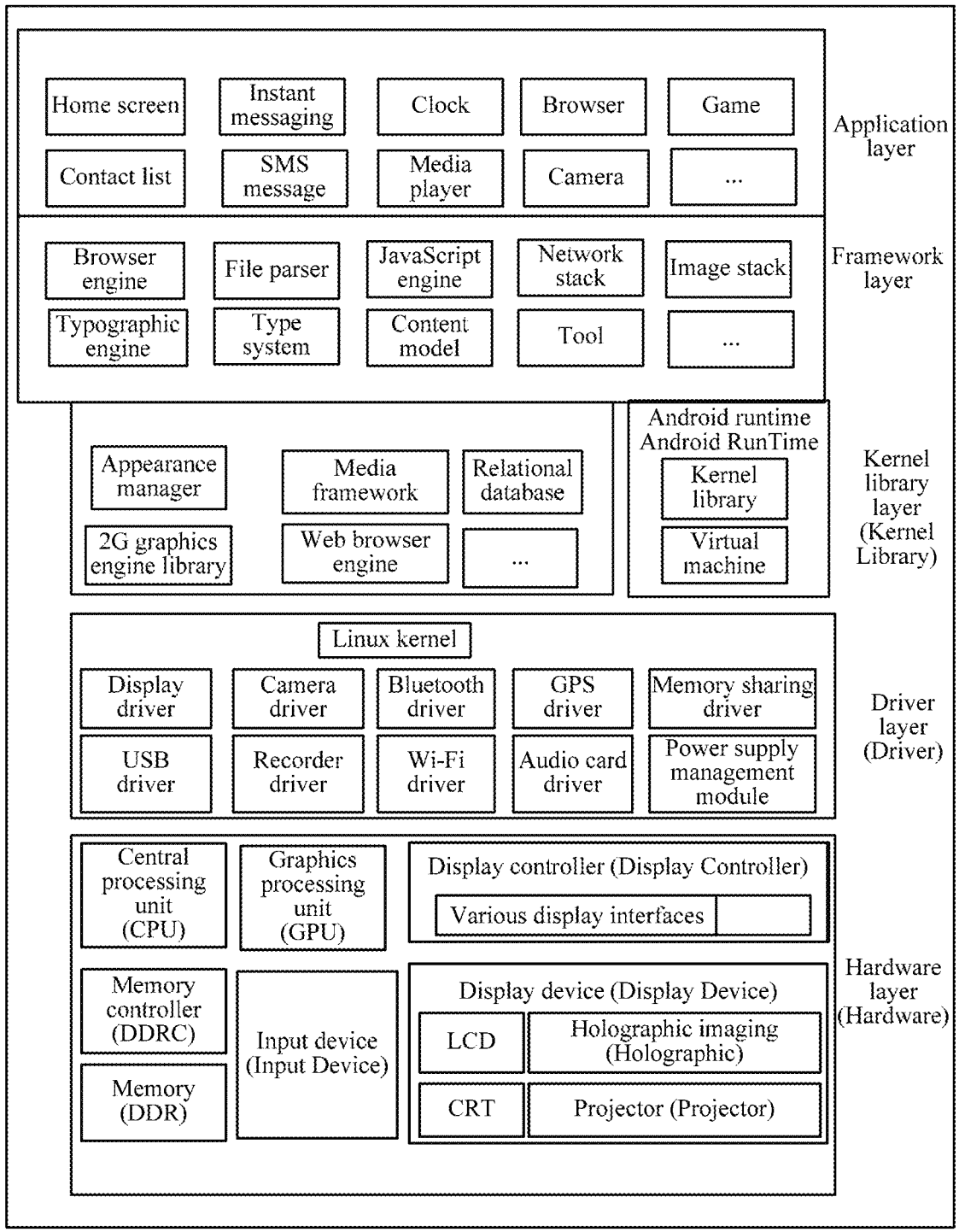
FIG. 12 is a schematic diagram of an operating system architecture according to an embodiment of this application.

In some implementations, the memory 302 stores the following elements, an executable module or a data structure, or a subset thereof or an extended set thereof:

an operating system 3021, including various system programs, for example, a framework layer, a kernel library layer, and a driver layer that are shown in FIG. 12, and configured to implement various basic services and process a hardware-based task; and an application program module 3022, including various application programs, for example, a launcher (launcher), a media player (Media Player), and a browser (Browser) that are shown in FIG. 12, and configured to implement various application services.

In this embodiment of the present invention, the processor 301 is configured to implement, by invoking a program or an instruction stored in the memory 302, the methods described in the embodiments of the present invention corresponding to FIG. 3 and FIG. 7.

Figure 13:
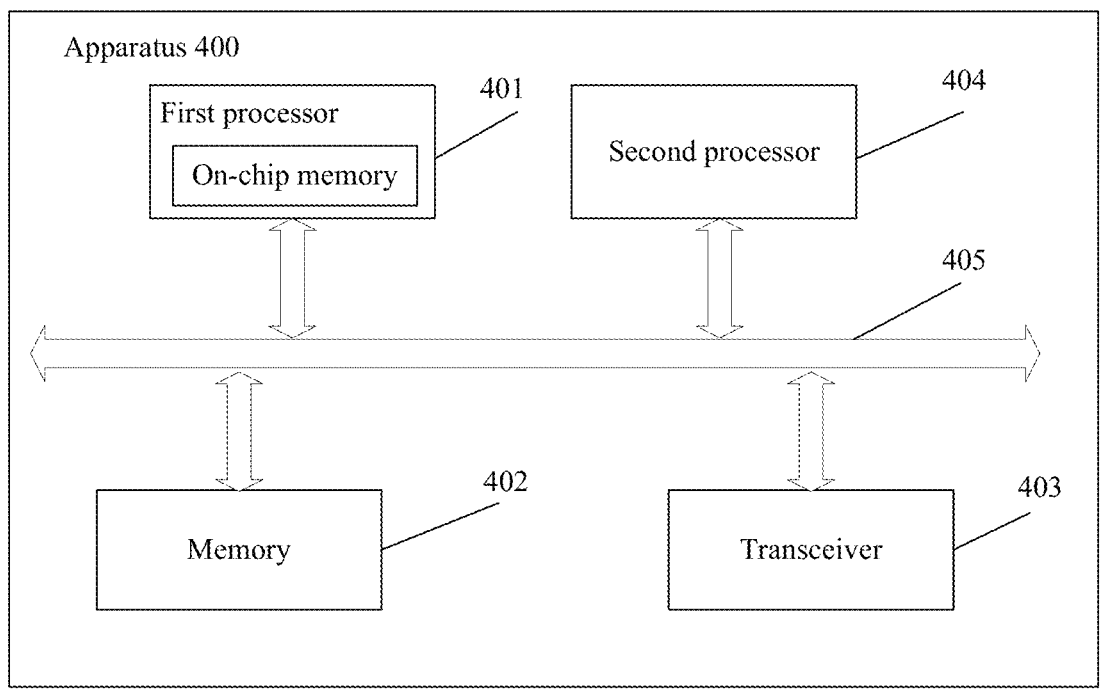
FIG. 13 is a schematic diagram of an apparatus according to an embodiment of this application.

An embodiment of the present invention provides a machine learning model training apparatus 400. As shown in FIG. 13, the device 400 includes a first processor 401, a memory 402, a transceiver 403, a second processor 404, and a communications bus 405. The communications bus 405 is configured to implement connection and communication between these components.

The transceiver 403 is configured to perform data transmission with an external component.

The memory 402 may include a read-only memory and a random access memory, and provide an instruction and data for the first processor 401 and the second processor 404. A part of the memory 402 may further include a nonvolatile random access memory (NVRAM) such as a RAM, a ROM, an EEPROM, a CD-ROM, an optical disc, a hard disk, and a magnetic storage apparatus. The memory 402 may be configured to store one or more of a computer program instruction, a preset parameter, or data obtained through intermediate computation by a computer.

The first processor 401 and the second processor 404 may be a central processing unit (central processing unit, CPU), a digital processing unit, or the like.

In this embodiment of the present invention, optionally, the first processor 401 includes an on-chip memory such as a TCM, a cache, or an SRAM. The on-chip memory stores an instruction. The first processor 401 is coupled to the on-chip memory, and is configured to implement the methods described in the embodiments of the present invention corresponding to FIG. 3 and FIG. 7. Alternatively, the first processor 401 is coupled to the on-chip memory to invoke the instruction stored in the on-chip memory, and is coupled to the memory 402 to obtain data, to implement the methods described in the embodiments of the present invention corresponding to FIG. 3 and FIG. 7. Actually, the first processor 401 may be an independently sold chip or may be integrated on a chip, where the chip includes the first processor 401.

Optionally, the second processor 404 is configured to implement, by invoking the program or the instruction stored in the memory 402, the methods described in the embodiments of the present invention corresponding to FIG. 3 and FIG. 7.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A machine learning model training method, comprising:

obtaining target task training data and N categories of support task training data, wherein both the target task training data and the N categories of support task training data are labeled data, the target task training data corresponds to a target task model, the N categories of support task training data are in a one-to-one correspondence with N support task models, and N is a positive integer;

inputting the target task training data and the N categories of support task training data into a memory model to obtain target task training feature data and N categories of support task training feature data, wherein both the target task training feature data and the N categories of support task training feature data are labeled data, the target task training feature data corresponds to the target task training data, and the N categories of support task training feature data are in a one-to-one correspondence with the N categories of support task training data;

training the target task model based on the target task training feature data;

obtaining a first loss of the target task model;

separately training the respectively corresponding support task models based on the N categories of support task training feature data;

obtaining respective second losses of the N support task models; and updating the memory model, the target task model, and the N support task models based on the first loss and the respective second losses of the N support task models, wherein the updating comprises:
  combining the first loss and the respective second losses of the N support task models to obtain a target loss; and
  updating a first parameter of the memory model, a second parameter of the target task model, and respective third parameters of the N support task models based on the target loss,
the method further including determining whether a quantity of updating times exceeds a first threshold; and
in response to determining that the quantity of updating times does not exceed the first threshold, obtaining target task training data and N categories of support task training data, and repeatedly training the target task model based on the target task training feature data and training the respectively corresponding support task models based on the N categories of support task training feature data, until the quantity of updating times exceeds the first threshold.

2. The method according to claim 1, wherein the target task training data comprises first target task training data and second target task training data;
  the inputting the target task training data into a memory model to obtain target task training feature data comprises:
    inputting the first target task training data and the second target task training data into the memory model to obtain first target task training feature data and second target task training feature data, wherein the target task training feature data comprises the first target task training feature data and the second target task training feature data, the first target task training feature data corresponds to the first target task training data, and the second target task training feature data corresponds to the second target task training data;
  the training the target task model based on the target task training feature data comprises
    training the target task model based on the first target task training feature data; and
  the obtaining a first loss of the target task model comprises:
    obtaining the first loss of the target task model based on the second target task training feature data and the trained target task model.

3. The method according to claim 2, wherein the second target task training feature data comprises target task feature information and a corresponding target task label; and
  the obtaining the first loss of the target task model based on the second target task training feature data and the trained target task model comprises:
    obtaining a first test result based on the target task feature information and the trained target task model; and
    calculating the first loss based on the first test result and the target task label.

4. The method according to claim 3, wherein the second target task training data comprises a plurality of target task test samples, correspondingly, the second target task training feature data comprises a plurality of target task test feature samples, and each target task test feature sample comprises first target task feature information and a corresponding first target task label;

the obtaining a first test result based on the target task feature information and the trained target task model comprises:
  obtaining, based on first target task feature information respectively corresponding to the plurality of target task test feature samples and the trained target task model, first test results respectively corresponding to the plurality of target task test feature samples; and
the calculating the first loss based on the first test result and the target task label comprises:
  calculating, based on the first test results respectively corresponding to the plurality of target task test feature samples and first target task labels respectively corresponding to the plurality of target task test feature samples, losses respectively corresponding to the plurality of target task test feature samples; and
  calculating the first loss based on the losses respectively corresponding to the plurality of target task test feature samples.

5. The method according to claim 1, wherein the target task training data comprises a plurality of pieces of first training labeled data, the target task training feature data comprises a plurality of pieces of first training feature data, and the plurality of pieces of first training feature data are in a one-to-one correspondence with the plurality of pieces of first training labeled data; and
  the training the target task model based on the target task training feature data comprises:
    training the target task model based on the plurality of pieces of first training feature data; and
  the obtaining a first loss of the target task model comprises:
    obtaining a plurality of losses of the target task model, wherein the plurality of losses of the target task model are in a one-to-one correspondence with the plurality of pieces of first training feature data; and
    calculating the first loss based on the plurality of losses of the target task model.

6. The method according to claim 1, wherein at least one category of the N categories of support task training data comprises first support task training data and second support task training data;
  the inputting the N categories of support task training data into a memory model to obtain N categories of support task training feature data comprises:
    for each category of the at least one category of support task training data, inputting the first support task training data and the second support task training data into the memory model to obtain first support task training feature data and second support task training feature data, wherein the first support task training feature data corresponds to the first support task training data, and the second support task training feature data corresponds to the second support task training data;
  the separately training the respectively corresponding support task models based on the N categories of support task training feature data comprises:
    for a support task model j, training the support task model j based on the first support task training feature data corresponding to the support task model j, wherein the support task model j is one of support task models corresponding to the at least one category of support task training data; and
  obtaining respective second losses of the N support task models comprises:

obtaining a second loss of the support task model j based on the second support task training feature data and the trained support task model j.

7. The method according to claim 6, wherein the second support task training feature data comprises support task feature information and a corresponding support task label; and
the obtaining a second loss of the support task model j based on the second support task training feature data and the trained support task model j comprises:
obtaining a second test result based on the support task feature information and the trained support task model j; and
calculating the second loss of the support task model j based on the second test result and the support task label.

8. The method according to claim 7, wherein the second support task training data comprises a plurality of support task test samples, correspondingly, the second support task training feature data comprises a plurality of support task test feature samples, and each support task test feature sample comprises first support task feature information and a corresponding first support task label;
the obtaining a second test result based on the support task feature information and the trained support task model j comprises:
obtaining, based on first support task feature information respectively corresponding to the plurality of support task test feature samples and the trained support task model j, second test results respectively corresponding to the plurality of support task test feature samples; and
the calculating the second loss of the support task model j based on the second test result and the support task label comprises:
calculating, based on the second test results respectively corresponding to the plurality of support task test feature samples and first support task labels respectively corresponding to the plurality of support task test feature samples, losses respectively corresponding to the plurality of support task test feature samples; and
calculating the second loss of the support task model j based on the losses respectively corresponding to the plurality of support task test feature samples.

9. The method according to claim 1, wherein each category of the N categories of support task training data comprises a plurality of pieces of second training labeled data, each category of the N categories of support task training feature data comprises a plurality of pieces of second training feature data, and the plurality of pieces of second training feature data are in a one-to-one correspondence with a plurality of pieces of second training labeled data in corresponding support task training data; and
the separately training the respectively corresponding support task models based on the N categories of support task training feature data and obtaining respective second losses of the N support task models comprises:
for a support task model i, training the support task model i based on the plurality of pieces of second training feature data corresponding to the support task model i, and obtaining a plurality of losses of the support task model i, wherein the plurality of losses of the support task model i are in a one-to-one correspondence with the plurality of pieces of second training feature data corresponding to the support task model i, and the support task model i is one of the N support task models; and
calculating the second loss of the support task model i based on the plurality of losses of the support task model i.

10. The method according to claim 1, wherein after the updating the memory model, the target task model, and the N support task models based on the first loss and the respective second losses of the N support task models, the method further comprises:
determining whether a difference between the first loss and a first loss obtained last time is less than a threshold; and
when the difference between the first loss and the first loss obtained last time is less than the threshold, outputting the target task model and the memory model; and
when the difference between the first loss and the first loss obtained last time is not less than the threshold, executing the process of obtaining target task training data and N categories of support task training data and repeatedly executing a training process.

11. The method according to claim 1, wherein after the updating a first parameter of the memory model, a second parameter of the target task model, and respective third parameters of the N support task models based on the target loss, the method further comprises:
determining whether a difference between the target loss and a target loss obtained last time is less than a threshold; and
when the difference between the target loss and the target loss obtained last time is less than the threshold, outputting the target task model and the memory model; and
when the difference between the target loss and the target loss obtained last time is not less than the threshold, executing the process of obtaining target task training data and N categories of support task training data and repeatedly executing a training process.

12. A task processing method, comprising:
obtaining target task data;
inputting the target task data into a memory model to obtain target task feature data; and
inputting the target task feature data into a target task model to obtain a target task result, wherein
the memory model, the target task model, and N support task models are obtained through joint training based on target task training data and N categories of support task training data, the target task training data corresponds to the target task model, the N categories of support task training data are in a one-to-one correspondence with the N support task models, the target task training data comprises a plurality of pieces of first labeled data, and each category of the N categories of support task training data comprises a plurality of pieces of second labeled data, wherein N is a positive integer,
wherein the memory model and the target task model are trained by:
obtaining the target task training data and the N categories of support task training data;
inputting the target task training data and the N categories of support task training data into the memory model to obtain target task training feature data and N categories of support task training feature data, wherein both the target task training feature data and the N categories of support task training feature data are labeled data, the target task training feature data corresponds to the target task training data, and the N categories of support task training feature data are in a one-to-one correspondence with the N categories of support task training data;

training the target task model based on the target task training feature data;

obtaining a first loss of the target task model;

separately training the respectively corresponding support task models based on the N categories of support task training feature data;

obtaining respective second losses of the N support task models; and updating the memory model, the target task model, and the N support task models based on the first loss and the respective second losses of the N support task models, wherein the updating comprises:

combining the first loss and the respective second losses of the N support task models to obtain a target loss;

updating a first parameter of the memory model, a second parameter of the target task model, and respective third parameters of the N support task models based on the target loss;

determining whether a quantity of updating times exceeds a first threshold; and in response to determining that the quantity of updating times does not exceed the first threshold, obtaining target task training data and N categories of support task training data, and repeatedly training the target task model based on the target task training feature data and training the respectively corresponding support task models based on the N categories of support task training feature data, until the quantity of updating times exceeds the first threshold.

13. The method according to claim 12, wherein before the inputting the target task feature data into a target task model to obtain a target task result, the method further comprises:

obtaining target task labeled data;

inputting the target task labeled data into the memory model to obtain target task labeled feature data;

training the target task model based on the target task labeled feature data; and wherein the inputting the target task feature data into a target task model to obtain a target task result comprises:

inputting the target task feature data into the trained target task model to obtain the target task result.

14. A machine learning model training apparatus, comprising:

a non-transitory memory storage comprising instructions; and one or more hardware processors in communication with the non-transitory memory storage, wherein the one or more hardware processors execute the instructions to:

obtain target task training data and N categories of support task training data, wherein both the target task training data and the N categories of support task training data are labeled data, the target task training data corresponds to a target task model, the N categories of support task training data are in a one-to-one correspondence with N support task models, and N is a positive integer;

input the target task training data and the N categories of support task training data into a memory model to obtain target task training feature data and N categories of support task training feature data, wherein both the target task training feature data and the N categories of support task training feature data are labeled data, the target task training feature data corresponds to the target task training data, and the N categories of support task training feature data are in a one-to-one correspondence with the N categories of support task training data;

train the target task model based on the target task training feature data;

obtain a first loss of the target task model;

separately train the respectively corresponding support task models based on the N categories of support task training feature;

obtain respective second losses of the N support task models; and update the memory model, the target task model, and the N support task models based on the first loss of the target task model and the respective second losses of the N support task models, wherein the instructions to update include instructions to:

combine the first loss of the target task model and the respective second losses of the N support task models to obtain a target loss;

update a first parameter of the memory model, a second parameter of the target task model, and respective third parameters of the N support task models based on the target loss;

wherein the one or more hardware processors further execute the instructions to:

determine whether a quantity of updating times exceeds a first threshold; and in response to determining that the quantity of updating times does not exceed the first threshold, obtain target task training data and N categories of support task training data, and repeatedly train the target task model based on the target task training feature data and train the respectively corresponding support task models based on the N categories of support task training feature data, until the quantity of updating times exceeds the first threshold.

15. A task processing apparatus, comprising:

a non-transitory memory storage comprising instructions; and one or more hardware processors in communication with the non-transitory memory storage, wherein the one or more hardware processors execute the instructions to:

obtain target task data;

input the target task data into a memory model to obtain target task feature data;

input the target task feature data into a target task model to obtain a target task result; and wherein the memory model, the target task model, and N support task models are obtained through joint training based on target task training data and N categories of support task training data, the target task training data corresponds to the target task model, the N categories of support task training data are in a one-to-one correspondence with the N support task models, the target task training data comprises a plurality of pieces of first labeled data, and each category of the N categories of support task training data comprises a plurality of pieces of second labeled data, wherein N is a positive integer, wherein the memory model and the target task model are trained by:

obtaining the target task training data and the N categories of support task training data;

inputting the target task training data and the N categories of support task training data into the memory model to obtain target task training feature data and N categories of support task training feature data, wherein both the target task training feature data and the N categories of support task training feature data are labeled data, the target task training feature data corresponds to the target task training data, and the N categories of support task training feature data are in a one-to-one correspondence with the N categories of support task training data;

training the target task model based on the target task training feature data;

obtaining a first loss of the target task model;

separately training the respectively corresponding support task models based on the N categories of support task training feature data;

obtaining respective second losses of the N support task models;

updating the memory model, the target task model, and the N support task models based on the first loss and the respective second losses of the N support task models, wherein the updating comprises:

combining the first loss and the respective second losses of the N support task models to obtain a target loss; and updating a first parameter of the memory model, a second parameter of the target task model, and respective third parameters of the N support task models based on the target loss;

determining whether a quantity of updating times exceeds a first threshold; and in response to determining that the quantity of updating times does not exceed the first threshold, obtaining target task training data and N categories of support task training data, and repeatedly training the target task model based on the target task training feature data and training the respectively corresponding support task models based on the N categories of support task training feature data, until the quantity of updating times exceeds the first threshold.

16. The apparatus according to claim 15, wherein the one or more hardware processors further execute the instructions to:

obtain target task labeled data;

input the target task labeled data into the memory model to obtain target task labeled feature data; and train the target task model based on the target task labeled feature data.

* * * * *